United States Patent
Kasparick et al.

(10) Patent No.: US 11,089,630 B2
(45) Date of Patent: Aug. 10, 2021

(54) METHOD FOR A CONTENTION-BASED RANDOM ACCESS PROCEDURE IN A WIRELESS COMMUNICATION NETWORK

(71) Applicant: Fraunhofer-Gesellschaft zur Foerderung der angewandten Forschung e.V., Munich (DE)

(72) Inventors: Martin Kasparick, Berlin (DE); Renato Luis Garrido Cavalcante, Berlin (DE); Dennis Wieruch, Berlin (DE); Josef Bernhard, Nabburg (DE); Gerd Kilian, Erlangen (DE); Benjamin Sackenreuter, Buckenhof (DE); Bernd Holfeld, Berlin (DE); Thomas Fehrenbach, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/446,515

(22) Filed: Jun. 19, 2019

(65) Prior Publication Data
US 2019/0306895 A1    Oct. 3, 2019

Related U.S. Application Data

(63) Continuation of application No. PCT/EP2017/083494, filed on Dec. 19, 2017.

(30) Foreign Application Priority Data

Dec. 21, 2016  (EP) ..................................... 16206005

(51) Int. Cl.
*H04W 4/00*  (2018.01)
*H04W 74/08*  (2009.01)
(Continued)

(52) U.S. Cl.
CPC ......... *H04W 74/0833* (2013.01); *H04L 1/165* (2013.01); *H04W 88/02* (2013.01); *H04W 88/08* (2013.01)

(58) Field of Classification Search
CPC .. H04W 74/0833; H04W 88/02; H04W 88/08
See application file for complete search history.

(56) References Cited

U.S. PATENT DOCUMENTS

| 8,437,769 B1 | 5/2013 | Sarkar et al. |
| 2010/0034155 A1* | 2/2010 | Noh .................. H04W 72/0413 370/329 |

(Continued)

OTHER PUBLICATIONS

Issam Toufik, et al., "LTE—The UMTS Long Term Evolution: From Theory to Practice," 2nd edition, John Wiley & Sons, 2011; pp. 144-147; 422-423; 426-431.

(Continued)

*Primary Examiner* — Abdelnabi O Musa
(74) *Attorney, Agent, or Firm* — Michael A. Glenn; Perkins Coie LLP

(57) ABSTRACT

A base station is configured to control a wireless communications network cell of a wireless communications network. The base station is configured to establish a connection to a first user equipment and to a second user equipment using a random access process. For establishing the connection to the first user equipment, the base station is configured to use a sequence of a first random access preamble, the sequence having a first length. For establishing the connection of the second user equipment, the base station is configured to use a sequence of a second random access preamble, the sequence having a second length.

25 Claims, 9 Drawing Sheets

(51) Int. Cl.
  *H04L 1/16*  (2006.01)
  *H04W 88/02*  (2009.01)
  *H04W 88/08*  (2009.01)

(56) References Cited

U.S. PATENT DOCUMENTS

| | | | |
|---|---|---|---|
| 2012/0077507 A1* | 3/2012 | Lee | H04W 74/006 455/450 |
| 2012/0093109 A1* | 4/2012 | Dong | H04W 74/008 370/329 |
| 2013/0083753 A1* | 4/2013 | Lee | H04W 72/0453 370/329 |
| 2013/0242730 A1* | 9/2013 | Pelletier | H04W 28/0284 370/230 |
| 2013/0286958 A1* | 10/2013 | Liang | H04W 74/0833 370/329 |
| 2015/0359007 A1* | 12/2015 | Liu | H04W 74/0866 370/329 |
| 2017/0290056 A1* | 10/2017 | Islam | H04W 74/085 |

OTHER PUBLICATIONS

"3rd Generation Partnership Project; Technical Specification Group Radio Access Network; E-UTRA; Physical channels and modulation (Release 13)", 3GPP TS 36.211 v13.1.0 (Mar. 2016).
3GPP TSG-RAN1 Meeting #85, Motorola Mobility, Change Request on TS 36.213 v13.1.1, R1-165972, May 23-27, 2016.
3GPP TSG-RAN WG4 Meeting #79, Huawei, HiSilicon, Change Request on TS 36.133 v13.3.0, R4-164481, May 23-27, 2016.
3GPP TSG-RAN2 Meeting #94, Ericsson (Rapporteur), Change Request on TS 36.321 v13.1.0, R2-164521, May 23-27, 2016.
Hongyan, "Cell Size Configuration in RACH (II)—Cyclic Shift", Dec. 21, 2010.

* cited by examiner

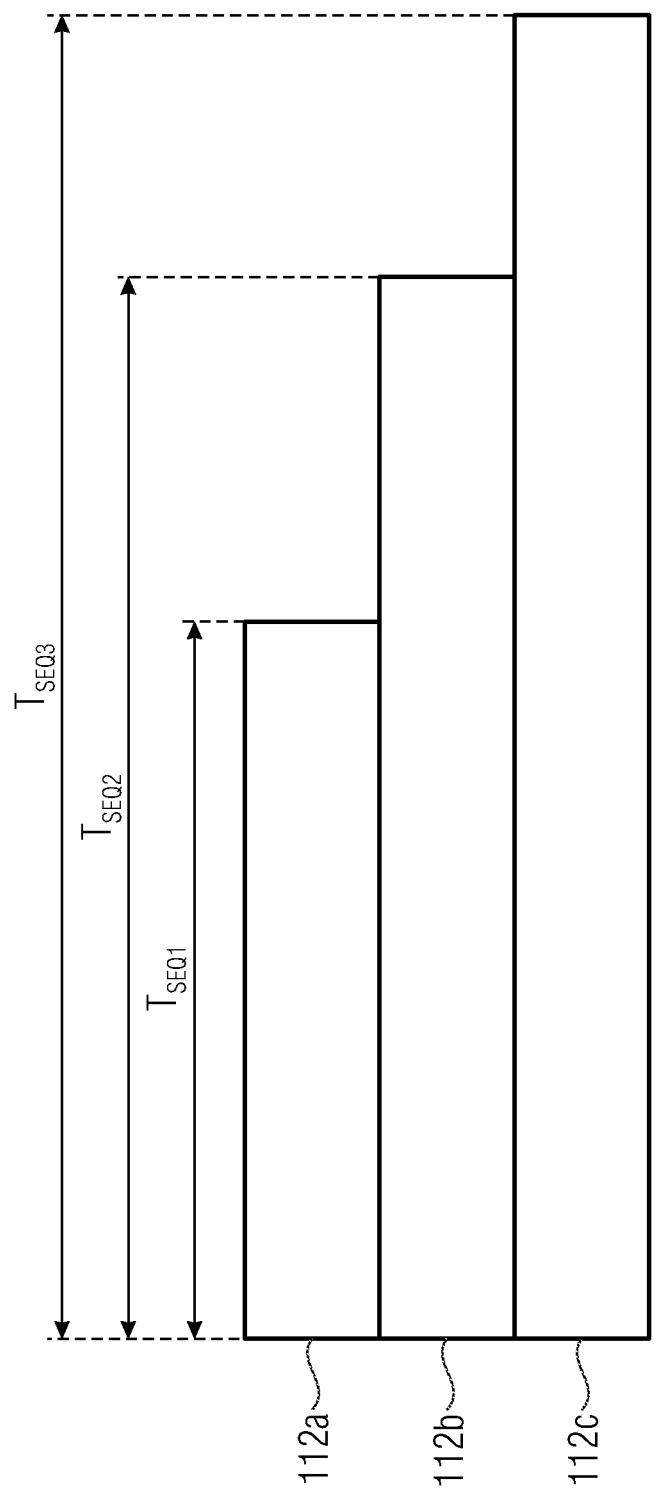

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 (see Note) | $448 \cdot T_s$ | $4096 \cdot T_s$ |

Note: Frame structure type 2 an special subframe configurations with UpPTS lenghts $4384 \cdot T_s$ and $5120 \cdot T_s$ only.

METHOD FOR A CONTENTION-BASED RANDOM ACCESS PROCEDURE IN A WIRELESS COMMUNICATION NETWORK

CROSS-REFERENCES TO RELATED APPLICATIONS

This application is a continuation of copending International Application No. PCT/EP2017/083494, filed Dec. 19, 2017, which is incorporated herein by reference in its entirety, and additionally claims priority from European Application No. EP 16 206 005.7, filed Dec. 21, 2016, which is incorporated herein by reference in its entirety.

BACKGROUND OF THE INVENTION

The present invention concerns the field of wireless communication networks or systems, more specifically, base stations, user equipment, methods for operating the same, a wireless communications network, radio signals and computer program. The invention further relates to support for multiple/adaptive preamble sequence length in cellular random access channels.

Random access procedures or processes in current cellular standards, such as 3GPP LTE, are needed for several different reasons, including the initial access of an idle mobile, the re-establishment of the association to the base station after a radio link failure, the handover to a different cell, and also in the case of downlink/uplink data transmission to/from a mobile that has lost time-synchronization [1].

Future cellular networks are expected to deal with huge numbers of Internet of Things (IoT) devices. A fast and efficient random access procedure is paramount to the success of massive machine-type-communications. Moreover, IoT devices are usually powered by batteries that have to last several years. However, the amount of data to be communicated is limited. This makes energy efficiency one of the topmost design goals for cellular communication systems with a large number of IoT devices. Today's random access channels in cellular networks, such as LTE, use preamble sequences.

In current cellular communication systems, an orthogonal sequence of fixed length is used as the random access channel (RACH) preamble. To increase the performance, the RACH preamble is repeated multiple times [2, 4]. The repetition compensates the effect of different cell sizes [2], and there are possibilities to derive the number of repetitions based on the received power [5, 6].

For example, in LTE, a Zadoff-Chu (ZC) sequence of 839 symbols is commonly applied [1]. In particular, in FDD (frequency division duplex) mode, four different standard preamble formats (0-3) are defined, which differ in size of the cyclic prefix (CP) and duration of the sequence.

FIG. 8a shows a schematic block diagram of a random access preamble used in 3GPP LTE, [2]. A cyclic prefix 1100 having a duration of TCP is followed by a sequence 1200 having a time duration of TSEQ.

FIG. 8b shows a table illustrating different values for the time durations TCP and TSEQ for different preamble formats (0-4). Longer sequences of format 2 and 3 are simply generated by repeating the sequence of the random access preamble, see FIG. 7a. A fifth preamble format (4) uses a sequence length of 139 symbols and is defined for frame structure 2 in TDD (time division duplex) only. Depending on the preamble format used, the preamble transmission spans from 1 ms (preamble format 0) up to 3 ms (preamble format 3) to adapt for the different sizes. FIG. 7b illustrates different durations of the cyclic prefix 1100 and the sequence 1200 as a multiple of Ts which is defined as 1/(15000×2048) seconds.

Longer sequences of format 2 and 3 in FIG. 8a are generated by repeating the sequence of the random access preamble. A fifth preamble format (4) uses a sequence length of 139 symbols, and it is defined for frame structure 2 (TDD—time division duplex) only. Depending on the preamble format used, the preamble transmission time spans from 1 ms (preamble format 0) up to 3 ms (preamble format 3), to adapt for the different cell sizes. As stated in [1], "the required PRACH preamble sequence duration $T_{SEQ}$ is then derived from the required preamble sequence energy to thermal noise ratio Ep/N0 to meet a target missed detection and false alarm probability, as follows:

$$T_{SEQ} = \frac{N_0 N_f}{P_{RA}(r)} \frac{E_p}{N_0}$$

wherein $N_0$ is the thermal noise power density (in mW/Hz). $P_{RA}$ is the PRACH signal power received at the base station (eNB) and $N_f$ is the receiver noise figure (in linear scale)".

The preamble format in 3GPP's LTE sets further limitations on the occurrence of the PRACH in even or any system frame numbers and on the subframe index used, see the table in FIG. 9a for frame structure type 1 (FDD) and the table in FIG. 9b for frame structure type 2 (TDD) in [2].

The ZC sequences used in LTE have a number of beneficial properties. Most importantly, sequences that are generated from cyclic shifts of the same root sequence are orthogonal. Sequences obtained from cyclic shifts of different ZC sequences are not orthogonal, but have low cross-correlation if a certain cell radius is not exceeded [7]. Therefore, orthogonal sequences obtained by cyclically shifting a single root sequence are favored over non-orthogonal sequences. Additional root sequences are used only when the needed number of sequences cannot be generated by a single root sequence. The number of sequences that can be generated from a single root sequence is given by the ratio of the length of the sequence to the cyclic shift size.

Given the existing 838 root sequences in LTE, only the index of the first root sequence is broadcast in a cell. The UEs derive the available pool of preamble signatures from a predefined ordering listed in [3]. A certain number of sequences from the available pool are used for contention-free access, while the remaining sequences can be used by the UEs for contention-based random access. From the contention-based pool, the UE picks a sequence at random.

There is a need to enhance random access procedures.

SUMMARY

An embodiment may have a base station configured to control a wireless communications network cell of a wireless communications network; wherein the base station is configured to establish a connection to a first user equipment and to a second user equipment using a random access process; wherein, to establish the connection to the first user equipment, the base station is configured to use a sequence of a first random access preamble, the sequence having a first length; and wherein, to establish the connection to the second user equipment, the base station is configured to use a sequence of a second random access preamble, the sequence having a second length.

Another embodiment may have a base station configured to control a wireless communications network cell of a wireless communications network; wherein the base station is configured to receive duration information indicating a duration of a random access process carried out by a user equipment; and wherein the base station is configured to adapt the control of the wireless communications network cell based on the duration information.

Another embodiment may have a user equipment configured to operate in a wireless communications network cell; wherein, to establishing connection to a base station, the user equipment is configured to transmit a first sequence having a first length during a first random access process and to transmit a second sequence having a second length during a second random access process, wherein the first sequence and the second sequence are repetition-free with respect to each other.

Another embodiment may have a user equipment configured to operate in a wireless communications network cell; wherein the user equipment is configured to establish a connection to a base station in the wireless communications network cell by performing a random access process; and wherein the user equipment is configured to transmit a duration information indicating a duration of a random access process carried out by a user equipment to the base station.

According to another embodiment, a wireless communications network may have: an inventive base station and an inventive a user equipment.

Another embodiment may have a radio signal having duration information indicating a duration of a random access process carried out by a user equipment in a wireless communications network cell being operated by a base station.

Another embodiment may have a radio signal having information indicating that a user equipment is instructed to use a sequence of one of a first sequence pool and a second sequence pool.

According to another embodiment, a method for operating a base station to control a wireless communications network cell of a wireless communications network may have the steps of: establishing a connection to a first user equipment and to a second user equipment using a random access process; wherein, to establish the connection to the first user equipment, a sequence of a first random access preamble is used, the sequence having a first length and wherein, to establish the connection to the second user equipment, a sequence of a second random access preamble is used, the sequence having a second length.

According to another embodiment, a method for operating a base station to control a wireless communications network cell of a wireless communications network may have the steps of: receiving duration information indicating a duration of a random access process carried out by a user equipment; and adapting the control of the wireless communications network cell based on the duration information.

According to another embodiment, a method for operating a user equipment to operate in a wireless communications network cell may have the steps of: transmitting, to establish connection to a base station, a first sequence having a first length during a first random access process and transmitting a second sequence having a second length during a second random access process, wherein the first sequence and the second sequence are repetition-free with respect to each other.

According to another embodiment, a method for operating a user equipment to operate in a wireless communications network cell may have the steps of: establishing a connection to a base station in the wireless communications network cell by performing a random access process; and transmitting a duration information indicating a duration of a random access process carried out by a user equipment to the base station.

Another embodiment may have a non-transitory digital storage medium having a computer program stored thereon to perform the method for operating a base station to control a wireless communications network cell of a wireless communications network, the method having the steps of: establishing a connection to a first user equipment and to a second user equipment using a random access process; wherein, to establish the connection to the first user equipment, a sequence of a first random access preamble is used, the sequence having a first length and wherein, to establish the connection to the second user equipment, a sequence of a second random access preamble is used, the sequence having a second length, when said computer program is run by a computer.

Another embodiment may have a non-transitory digital storage medium having a computer program stored thereon to perform the method for operating a base station to control a wireless communications network cell of a wireless communications network, the method having the steps of: receiving duration information indicating a duration of a random access process carried out by a user equipment; and adapting the control of the wireless communications network cell based on the duration information, when said computer program is run by a computer.

Another embodiment may have a non-transitory digital storage medium having a computer program stored thereon to perform the method for operating a user equipment to operate in a wireless communications network cell, the method having the steps of: transmitting, to establish connection to a base station, a first sequence having a first length during a first random access process and transmitting a second sequence having a second length during a second random access process, wherein the first sequence and the second sequence are repetition-free with respect to each other, when said computer program is run by a computer.

Another embodiment may have a non-transitory digital storage medium having a computer program stored thereon to perform the method for operating a user equipment to operate in a wireless communications network cell, the method having the steps of: establishing a connection to a base station in the wireless communications network cell by performing a random access process; and transmitting a duration information indicating a duration of a random access process carried out by a user equipment to the base station, when said computer program is run by a computer.

The inventors have found that by using random access sequences of different length at a same time in the wireless communications network cell, energy may be saved, in particular, for user equipment that would be recognized by the base station when using a short sequence. At the same time, user equipment that might face a missed detection, i.e., a re-transmission of the sequence, may save energy when using a longer sequence that allows for recognition at the base station and thus avoiding re-transmission. Avoiding re-transmission and saving energy allows for an improve of the random access procedure.

The inventors have further found out that control of the wireless communications network cell may be improved when considering a duration information indicating a duration of a random access process carried out by a user equipment. This duration information may indicate a quality of the random access process and may allow for a reconfiguration of the random access process at the base station and may thus allow for improving the random access procedure.

According to an embodiment, a base station is configured to control a wireless communications network cell of a wireless communications network. The base station is configured to establish a connection to a first user equipment and to a second user equipment using a random access process. For establishing the connection to the first user equipment, the base station is configured to use a sequence of a first random access preamble, the sequence having a first length. For establishing the connection to the second user equipment, the base station is configured to use a sequence of a second random access preamble, the sequence having a second length. Using sequences of different lengths may allow for a high flexibility and a high efficiency for establishing communication channels, as different criteria may be implemented.

According to an embodiment, the base station is configured to establish the first connection at a first time instance while not accepting the sequence having the second length and to establish the second connection at a second time instance while not accepting the sequence having the first length. By accepting sequences of a certain length at a time instance, interference between sequences of different lengths may avoided which may allow for a low error rate and for a high efficiency due to a low effort for re-transmission.

According to an embodiment, the sequence having the first length and the sequence having the second length are repetition-free with respect to each other, i.e., a longer sequence does not comprise a repetition of two or more copies of the sequence having the shorter length.

Using sequences that are repetition-free with respect to each other allows for a high precision when detecting the sequences at the base station.

According to an embodiment, the first user equipment and the second user equipment differ from each other with respect to a requirement on transmission quality or with respect to a requirement on transmission latency. Thus, different lengths of the sequence may be associated to different criteria for transmission and may this allow for implementing a quality of service.

According to an embodiment, the base station is configured to transmit a radio signal to the first user equipment, the radio signal comprising information indicating that the first user equipment is instructed to use a sequence comprising the first length. Thus, the base station may determine a length of a sequence to be used which may allow for a distribution of load in the cell by the base station.

According to a further embodiment, the base station is configured to transmit a radio signal to the first user equipment, the radio signal comprising information indicating that the first user equipment is instructed to use a sequence having the first length or to use a sequence having the second length. This may allow for a decision being made by the user equipment as to which length to use and may allow for a high flexibility in the wireless communications network cell.

According to an embodiment, the base station is configured to change one of the first lengths and one of the second lengths dynamically. This may allow for a dynamic adaption of the communication in the wireless communications network cell, e.g., when a load status or environmental conditions change.

According to an embodiment, a base station is configured to receive duration information indicating a duration of a random access process carried out by a user equipment. The base station is configured to adapt the control of the wireless communications network cell based on the duration information. The duration information allows for a conclusion on how effective the random access process is carried out by the user equipment. This may allow for changing control of the wireless communications network cell so as to reduce the duration of the random access process and thus to increase performance of the network cell.

According to an embodiment, a user equipment is configured to operate in a wireless communications network cell. The user equipment is configured, for establishing a connection to a base station, to transmit a first sequence having a first length during a first random access process and to transmit a second sequence having a second length during a second random access process, wherein the first sequence and the second sequence are repetition-free with respect to each other. Using different lengths of the sequence may allow for sequences that are adapted to a specific situation and may allow for a low energy consumption or a high reliability of the random access process.

According to an embodiment, the user equipment is configured to receive a radio signal from the base station, the radio signal comprising information indicating that the user equipment is instructed to use a sequence having the first length or to use a sequence having the second length. The user equipment is configured to select a sequence having the first length or a sequence having the second length based on operational parameters of the user equipment. This may allow for implementing a priority class or a quality of service management as the user equipment may select among different lengths, wherein a different length may allow for increasing detection probability or to decrease energy consumption such that operation parameters may be taken into account when performing the random access process.

According to an embodiment, the user equipment is configured to receive a radio signal from the base station, the radio signal comprising information indicating that the user equipment is instructed to use a sequence having the first length or is instructed to use a sequence having the second length. The user equipment is configured to use the sequence according to the instructions. This may allow for a high controllability of the wireless communications network cell by the base station.

According to an embodiment, a user equipment is configured to operate in a wireless communications network cell. The user equipment is configured to establish a connection to a base station in the wireless communications network cell by performing a random access process. The user equipment is configured to transmit a duration information indicating a duration of a random access process carried out by a user equipment to the base station. This may allow for enabling the base station to use the duration information for controlling the wireless communications network cell.

Further embodiments relate to a wireless communications network comprising a base station and a user equipment according to embodiments described herein.

Further embodiments relate to a radio signal comprising duration information indicating a duration of a random access process carried out by a user equipment in a wireless communications network cell being operated by a base station.

Further embodiments relate to a radio signal comprising information indicating that a user equipment is instructed to use a sequence of one of a first sequence pool and a second sequence pool.

Further embodiments relate to a method for operating a base station to control a wireless communications network cell of a wireless communications network. The method comprises establishing a connection to a first user equipment and to a second user equipment using a random access process. For establishing the connection to the first user equipment, a sequence of a first random access preamble is used, the sequence having a first length. For establishing the connection to the second user equipment, a sequence of a second random access preamble is used, the sequence having a second length.

According to a further embodiment, a method for operating a base station to control a wireless communications network cell of a wireless communications network comprises receiving duration information indicating a duration of a random access process carried out by a user equipment. The method comprises adapting the control of the wireless communications network cell based on the duration information.

According to a further embodiment, a method for operating a user equipment to operate in a wireless communications network cell comprises transmitting, for establishing a connection to a base station, a first sequence having a first length during a first random access process and transmitting a second sequence having a second length during a second random access process, wherein the first sequence and the second sequence are repetition-free with respect to each other.

Further embodiments relate to a method for operating a user equipment to operate in a wireless communications network cell. The method comprises establishing a connection to a base station in the wireless communications network cell by performing a random access process. The method further comprises transmitting a duration information indicating a duration of a random access process carried out by a user equipment to the base station.

Further embodiments relate to a non-transitory computer program product comprising a computer readable medium storing instructions which, when executed on a computer, carry out a method according to embodiments described herein.

BRIEF DESCRIPTION OF THE DRAWINGS

Embodiments of the present invention will be detailed subsequently referring to the appended drawings, in which:

FIG. 4a shows a schematic diagram representing sequences used for the random access process, the sequences comprising different lengths, according to an embodiment;

FIG. 8a shows a schematic block diagram of a random access preamble according to conventional technology; and FIG. 8b shows a table illustrating different values for the time durations for different preamble formats of FIG. 8a.

DETAILED DESCRIPTION OF THE INVENTION

Figure 1:
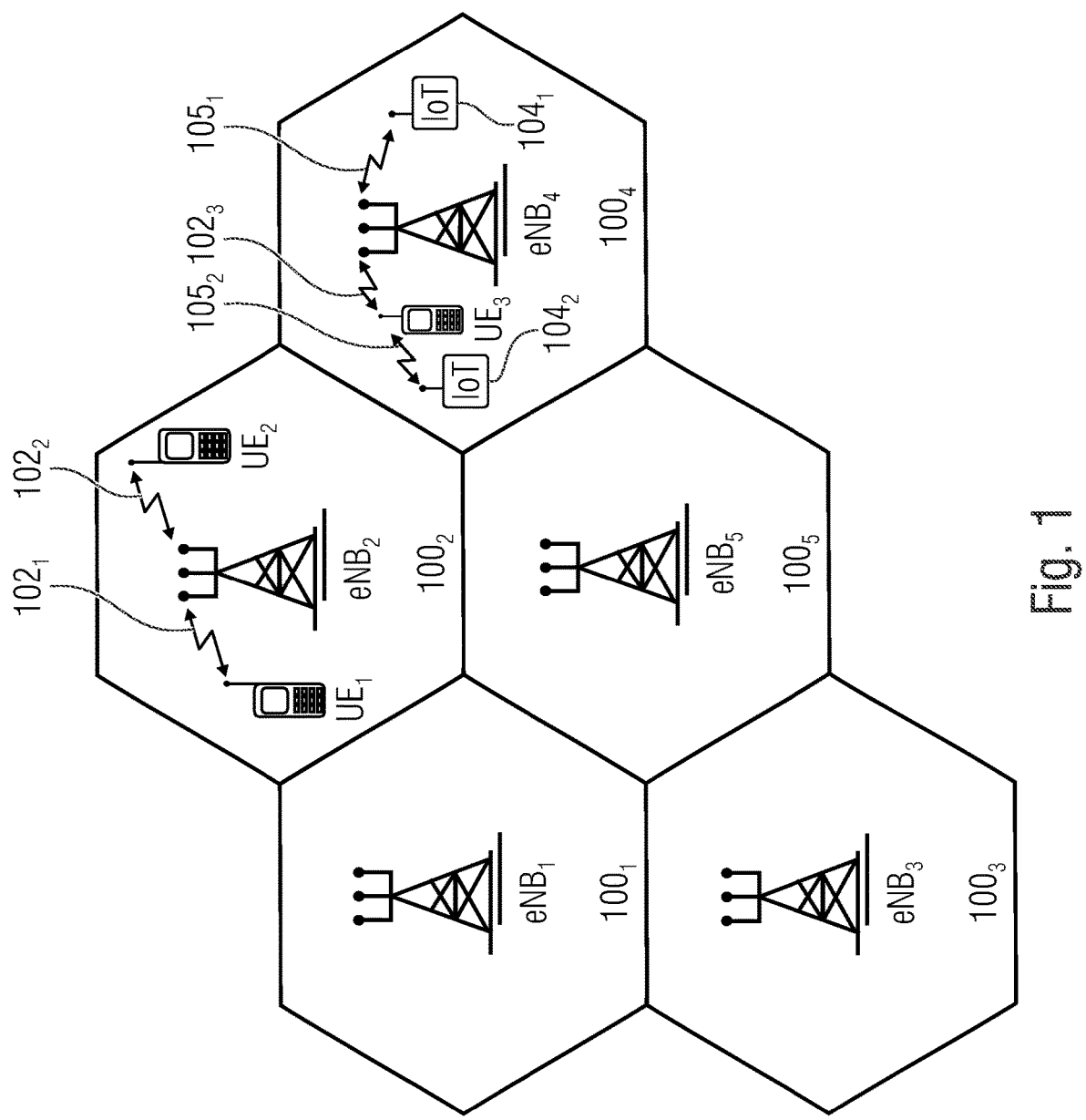
FIG. 1 shows a schematic representation of an example of a wireless communications system according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Embodiments described herein may refer to a behavior of a user equipment in the wireless communications network cell. Although description is provided in connection with a user equipment, the same principles may be applied, without limitation, to other nodes in a wireless communications network, such as IoT devices or the like.

In 3GPP, there exist three different classes of low power devices: devices that are used in the Internet of Things (IoT) that use a narrow bandwidth (NB), thus NB-IoT enhanced machine-type communication (eMTC or LTE-M) and massive machine type communications (mMTC). In contrast to the legacy LTE system, in narrowband-IoT (NB-IoT) the physical layer random access preamble is based on single-carrier frequency-hopping symbol groups [2]. Since the random access procedure still exists, the solution can be also adapted to these classes. Embodiments described herein relate to apparatus that access a random access channel by a contention-based random access procedure.

IoT devices may include physical devices, vehicles, buildings and other items having embedded therein electronics, software, sensors, actuators, or the like as well as network connectivity that enable these devices to collect and exchange data across an existing network infrastructure. FIG. 1 is a schematic representation of an example of such a network infrastructure, like a wireless communication system including a plurality of base stations $eNB_1$ to $eNB_5$, each serving a specific area surrounding the base station schematically represented by the respective cells $100_1$ to $100_5$. The base stations are provided to serve users within a cell. A user may be a stationary device or a mobile device. Further, the wireless communication system may be accessed by IoT devices which connect to a base station or to a user. FIG. 1 shows an exemplary view of only five cells, however, the wireless communication system may include more such cells. FIG. 1 shows two users $UE_1$ and $UE_2$, also referred to as user equipment (UE), that are in cell $100_2$ and that are served by base station $eNB_2$. Another user $UE_3$ is shown in cell $100_4$ which is served by base station $eNB_4$. The arrows $102_1$, $102_2$ and $102_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $104_1$ and $104_2$ in cell $100_4$, which may be stationary or mobile devices. The IoT device $104_1$ accesses the wireless communication system via the base station $eNB_4$ to receive and transmit data as schematically represented by arrow $105_1$. The IoT device $104_2$ accesses the wireless communication system via the user $UE_3$ as is schematically represented by arrow $105_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), may be used.

Standard LTE devices, like the users $UE_1$, $UE_2$, $UE_3$, operate within a first bandwidth, and the IoT devices $104_1$ and $104_2$ operate within a second bandwidth which is narrower than the first bandwidth. The second bandwidth may be defined in accordance with the NB-IoT enhancement of the LTE Rel. 13 standard, referred to in the following also as NB-IoT. A wireless communication system operating in accordance with the LTE standard may have a system bandwidth of 1.4 MHz, 3.0 MHz, 5 MHz, 10 MHz, 15 MHz, 20 MHz or aggregated system bandwidth consisting of any combination of these, and the bandwidth in accordance with the NB-IoT enhancement of the LTE Rel. 13 standard may be by 200 kHz.

An OFDMA system for data transmission may include an OFDMA-based physical resource grid which comprises plurality of physical resource blocks (PRBs) each defined, for example, by 12 subcarriers by 7 OFDM symbols and including a set of resource elements to which various physical channels and physical signals are mapped. Other configurations may comprise a scaled numerology with, for example, up to 48 subcarriers. A resource element is made up of one symbol in the time domain and one subcarrier in the frequency domain. For example, in accordance with the LTE standard a system bandwidth of 1.4 MHz includes 6 PRBs, and the 200 kHz bandwidth in accordance with the NB-IoT enhancement of the LTE Rel. 13 standard includes 1 PRB. In accordance with LTE and NB-IoT, the physical channels may include the physical downlink shared channel (PDSCH) including user specific data, also referred to as downlink payload data, the physical broadcast channel (PBCH) including for example the master information block (MIB) or the system information block (SIB), the physical downlink control channel (PDCCH) including for example the downlink control information (DCI), etc. The physical signals may comprise reference signals (RS), synchronization signals and the like. The LTE resource grid comprises a 10 ms frame in the time domain having a certain bandwidth in the frequency domain, e.g. 1.4 MHz. The frame has 10 subframes of 1 ms length, and each subframe includes two slots of 6 or 7 OFDM symbols depending on the cyclic prefix (CP) length.

An apparatus such as one of the user equipment $UE_1$, $UE_2$ and $UE_3$ and/or an IoT device $104_1$ or $104_2$ may request a corresponding base station $eNB_2$ or $eNB_4$ for allocating one or more resource elements, for example, a channel. When the apparatus is unknown to the base station then it may use a physical random access channel.

Figure 2:
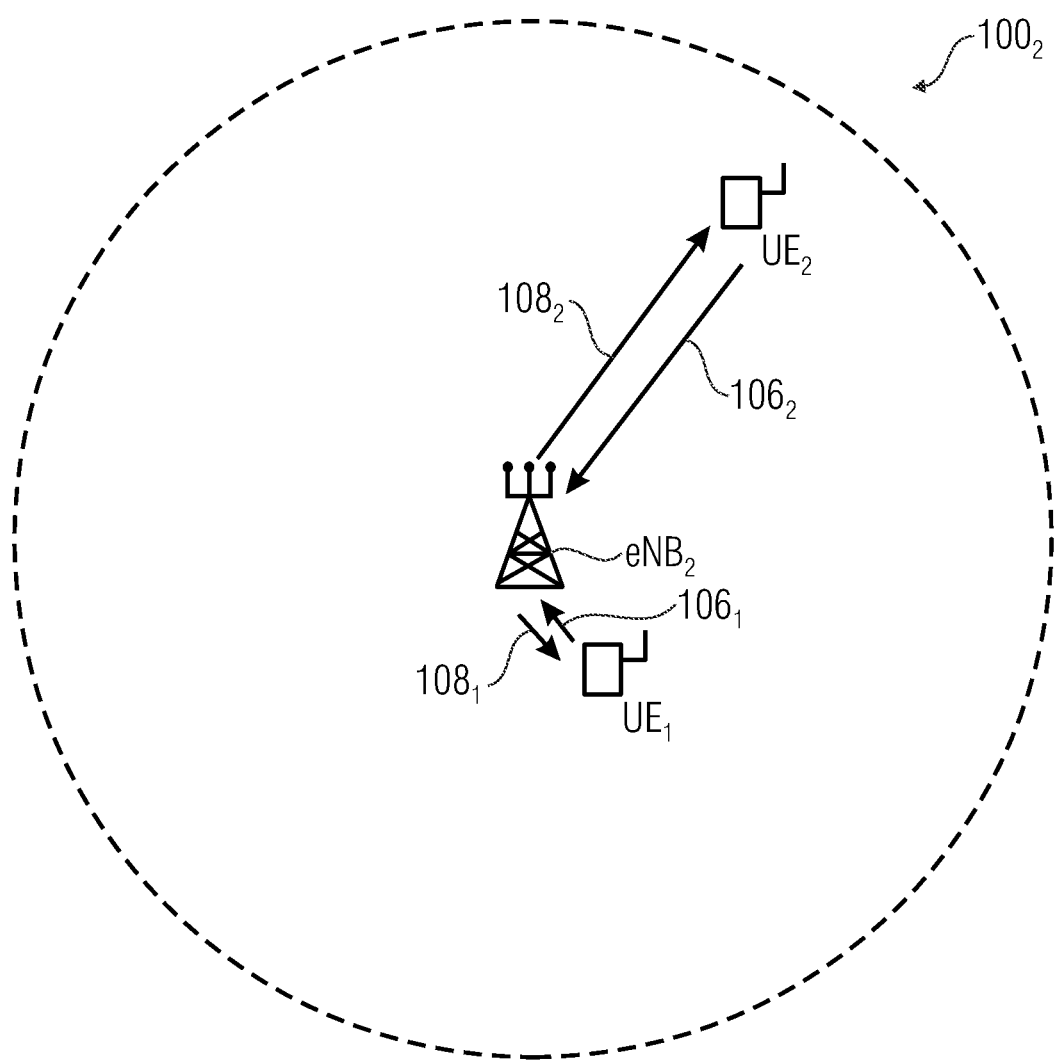
FIG. 2 shows a schematic representation of a wireless communications network cell of the wireless communications network of FIG. 1, being operated by a base station, according to an embodiment.

FIG. 2 is a schematic representation of the wireless communications network cell $100_2$ being operated by $eNB_2$. By non-limiting example only, a first user equipment $UE_1$ and a second user equipment $UE_2$ are in the cell and try to access resources by performing a random access process each.

Figure 3:
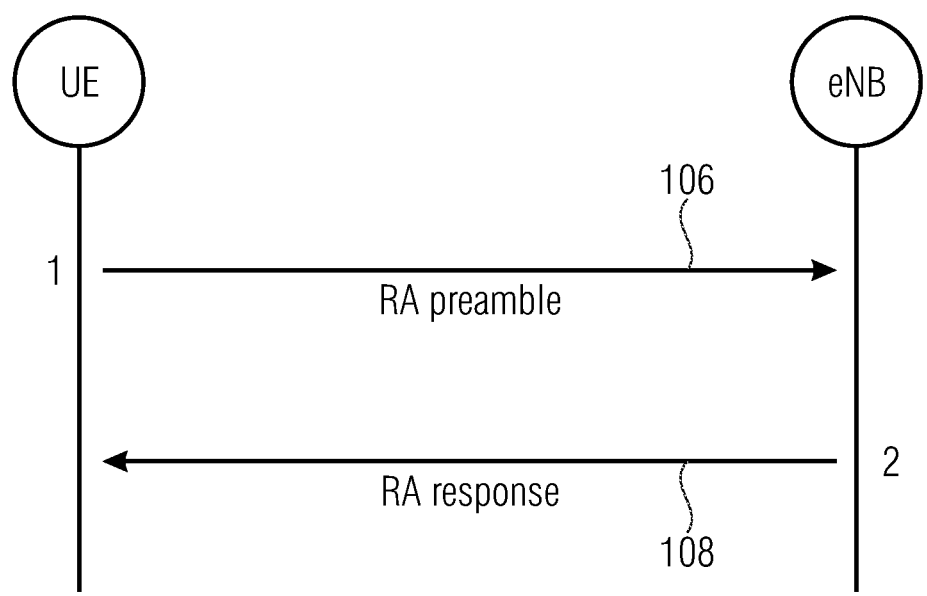
FIG. 3 shows a schematic flow chart of at least a part of a random access process, according to an embodiment.

As is also illustrated in FIG. 3 illustrating a schematic flow chart of at least a part of a random access process, the user equipment transmits a random access (RA) preamble to the eNB by transmitting a radio signal 106, i.e., the radio signal $106_1$ or the radio signal $106_2$, to the base station. In case of a successful detection of the radio signal 106 by the eNB, the eNB transmits a RA response 108 to the respective user equipment. I.E., the $eNB_2$ may transmit a radio signal $108_1$ responding to the radio signal $106_1$ to the user equipment $UE_1$ and may transmit a radio signal $108_2$ responding to the radio signal $106_2$ to the user equipment $UE_2$.

The user equipment $UE_1$ and $UE_2$ may use a contention-based random access process, i.e., they select a sequence out of a pool of sequences and may transmit the sequences incorporated into a preamble.

FIG. 4a illustrates a schematic diagram representing sequences 112a to 112c comprising different lengths $T_{SEQ1}$, $T_{SEQ2}$, $T_{SEQ3}$, respectively.

The sequences 112a to 112c may be incorporated into preambles transmitted to the base station, i.e., a user equipment $UE_1$ or $UE_2$ may incorporate one of the sequences 112a to 112c into the radio signal $106_1$, $106_2$, respectively.

The different lengths of the sequences 112a, 112b and 112c may relate to a duration needed for transmission of the respective sequence. This may be synonymous to a number of symbols or samples to be transmitted for transmitting the respective sequence 112a, 112b or 112c.

Figure 4B:
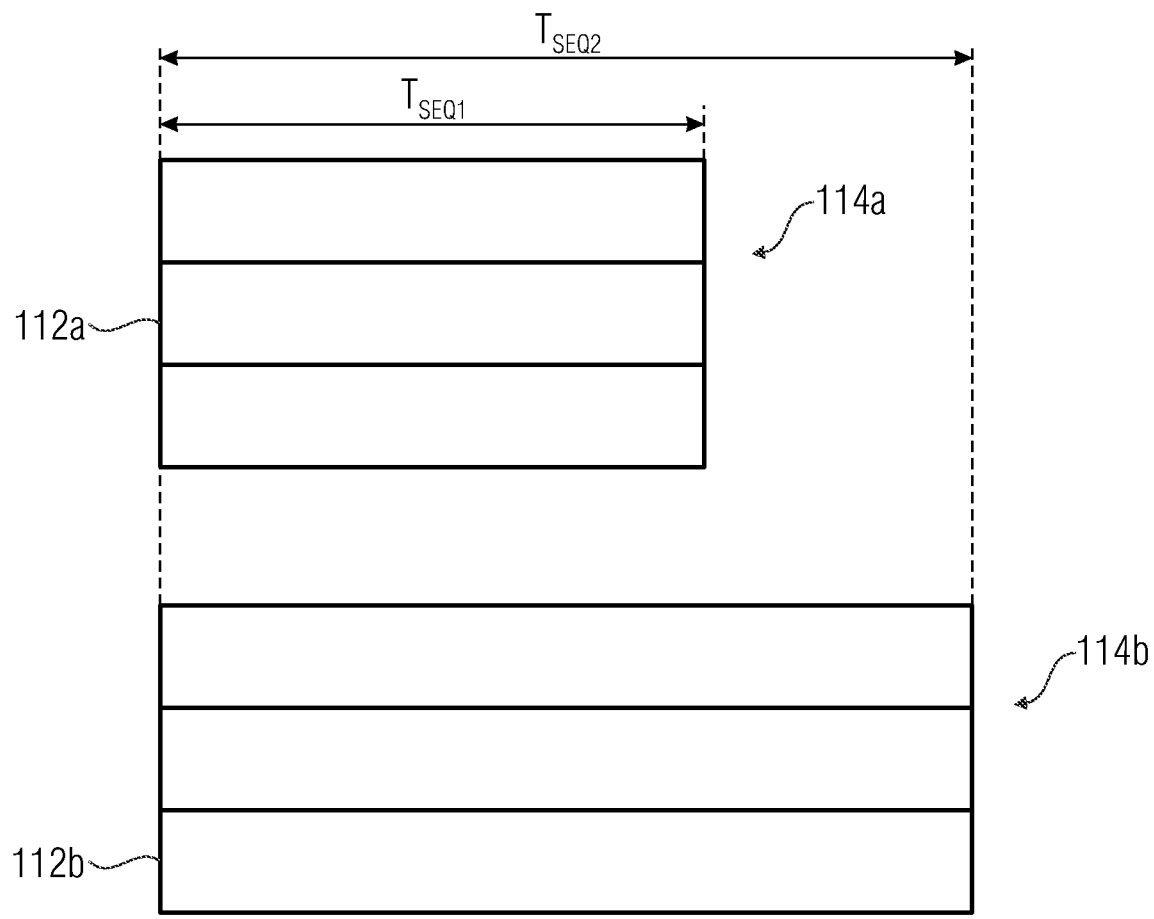
FIG. 4b shows a schematic diagram of a first pool of sequences and a second pool of sequences, according to an embodiment.

FIG. 4b shows a schematic diagram of a first pool 114a of sequences and a second pool 114b of sequences. For example, the sequence 112a may be one of the sequences of the pool 114a of sequences, wherein the sequence 112b may be one of the sequences of the pool 114b of sequences. I.E., the base station and/or the user equipment may use or select a sequence from a respective pool 114a or 114b of sequences. Each sequence in the pool 114a may be repetition-free when compared to each of the sequences of pool 114b. Furthermore, each of the sequences of a pool used in the wireless communications network cell may be repetition-free when compared to every sequence in every other pool. Repetition-free may be understood to mean the one sequence may not be expressed as a repetition of a different sequence or that a sequence of shorter length is not contained in a sequence of longer length. Put it differently, the longer sequences does not simply consist of repetitions of the shorter sequence. A method for operating a user equipment to operate in a wireless communications network cell, may comprise transmitting, to establish connection to a base station, the first sequence 112a having a first length $T_{SEQ1}$. The first sequence may be transmitted during a first random access process. The method further comprises transmitting the second sequence 112b having the second length $T_{SEQ2}$ during a second random access process, wherein the first sequence 112a and the second sequence 112b are repetition-free with respect to each other.

Sequences within one pool may be orthogonal or may comprise a low cross-correlation. Sequences that comprise a low cross-correlation may be, for example, gold-codes and KASAMI-codes or the like. For example, a maximum value of a cross-correlation, may be, for example, at most 0.5, 0.4 or 0.3 of a maximum normalized value of the cross-correlation.

Figure 5:
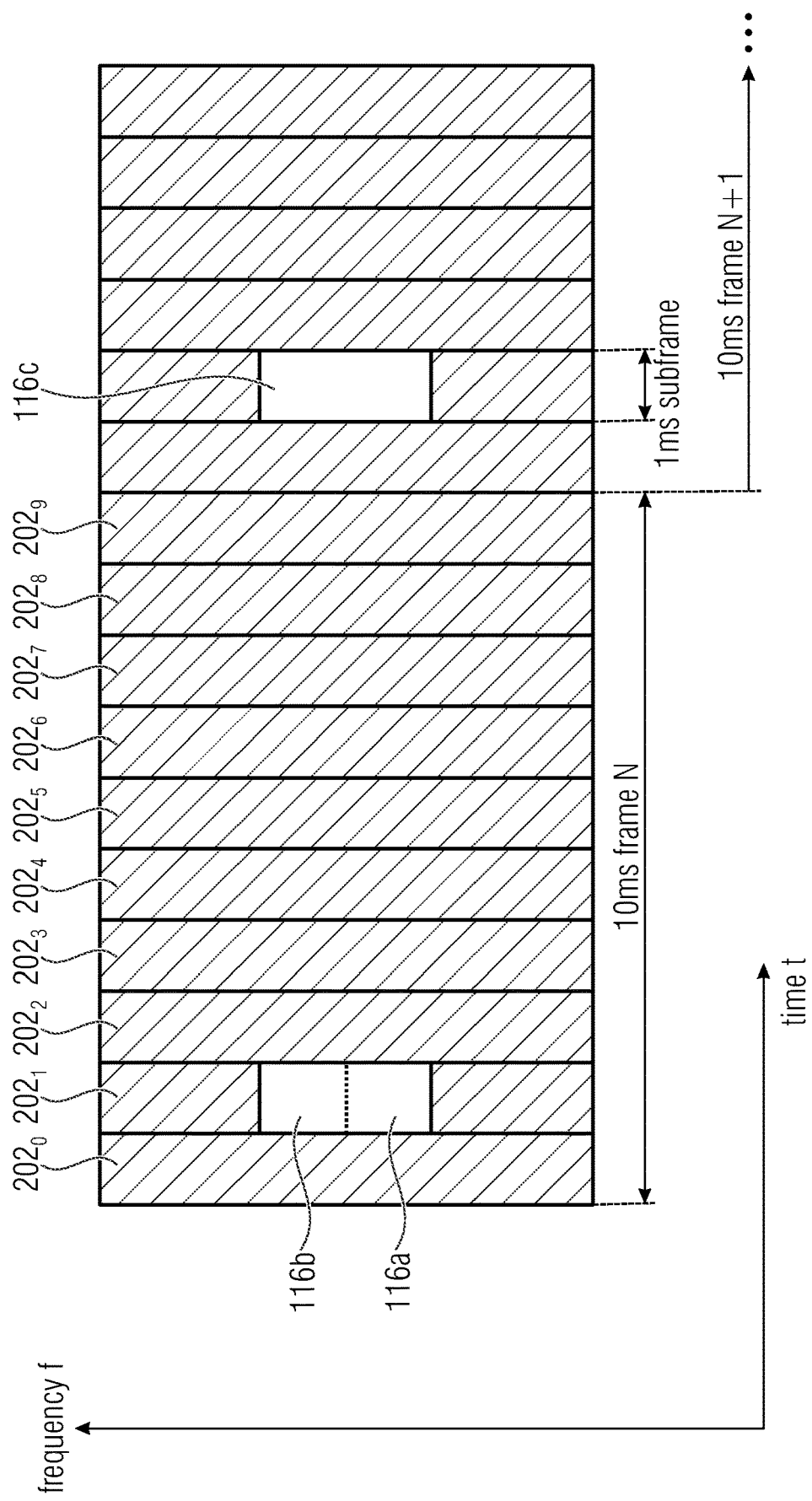
FIG. 5 shows a schematic diagram of a possible frame structure according to an embodiment.

FIG. 5 illustrates a schematic diagram of a possible frame structure according to an embodiment. The base station and the user equipment in the wireless communications network cell $100_2$ illustrated in FIG. 2 may use, for example, an LTE frame structure according to which a 10 ms frame M comprising 10 subframes $202_0$ to $202_9$ is followed by a subsequent 10 ms frame N+1.

Some subframes may comprise resources that may be used for the physical random access channel PRACH. Those resources are illustrated as 116a, 116b and 116c in FIG. 5. The base station $eNB_2$ may be configured to define the PRACH channels 116a, 116b and 116c such that sequences of a specific length are associated to one of the PRACH 116a to 116c. Thus, the base station if configured to establish the connection to the user equipment $UE_1$ at a first time instance while not accepting the sequence having a length used by the user equipment $UE_2$ and to establish the connection to the user equipment $UE_2$ at a second time instance while not accepting the sequence having the length used by the user equipment $UE_1$. For example, different time instances may be obtained by using PRACH of different frames N or N+1. Although used in terms of time, the term time instance may also be understood as a separation in frequency as illustrated for PRACH 116a and 116b. Thus, the base station may be configured to associate different lengths of the sequences to different PRACH or sections thereof in frequency and/or time.

Figures 8A, 8B:
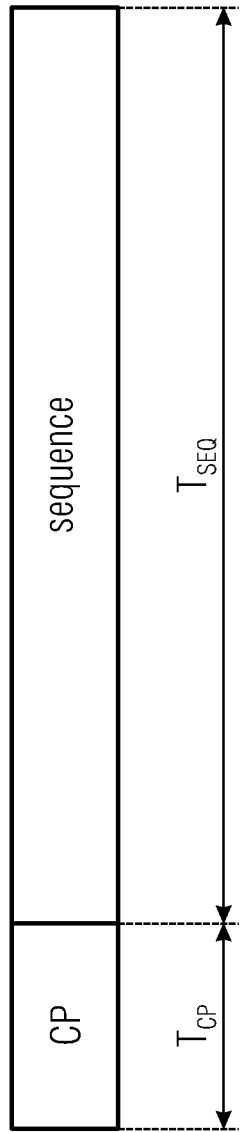

When compared to a known change of the preamble format, i.e., a change of the preambles of FIG. 8b, the base station may maintain the connection to user equipment $UE_1$ and $UE_2$ having used different lengths of the sequences simultaneously. Alternatively or in addition, the base station $eNB_2$ may be configured to dynamically change the association of sequences of different lengths to different PRACH and/or for changing allowed or instructed lengths of sequences dynamically, i.e., without requiring a reconnection or a re-boot of the wireless communications network cell $100_2$.

For example, the user equipment $UE_1$ and the user equipment $UE_2$ may have different requirements in view of their transmission which may relate to a transmission quality and/or to a transmission latency. A transmission latency may be important, for example, when using data transmission for bi-directional voice transmission, for example, when using voice-over IP (VoIP) services. A transmission quality may also be of importance when using voice transmissions but may also be of importance when using, for example, streaming services or the like. In general, user equipment $UE_1$ and $UE_2$ may involve different prioritization of data transmission which may be implemented by the sequences comprising different lengths. For example, using a longer sequence length may allow for a higher probability of being recognized by the base station when compared to a shorter sequence. Thus, when needing a high quality of service or having a high priority of data transmission, then the user equipment may be configured to select a sequence comprising a comparatively long duration.

On the other hand, user equipment comprising a low distance and/or a good channel or propagation delay to the base station, for example, user equipment $UE_1$, may decide to use a comparatively short sequence as the probability of being recognized by the base station is high due to the good propagation properties. Thus, energy may be saved which may be used to increase the battery lifetime of the user equipment which may also be understood as an IoT device or the like.

The base station may dynamically change and/or individually determine different lengths of sequences to be used. The base station $eNB_2$ may be configured to transmit or broadcast a radio signal that may be received by the user equipment in the cell $100_2$. The radio signal may comprise information indicating that the user equipment is instructed to use sequences having one of a first length or a second length. For example, the base station may indicate possible lengths of the sequences. The user equipment may then select one of the allowed lengths and/or one of the sequences of a pool that has the allowed length. The user equipment may be configured to select the length based on an operational parameter of the user equipment. Such an operational parameter may be, for example, a status of the battery such as full or almost empty, a SNR, a distance to the base station or the like. For example, the user equipment may, when having a comfortable charging state of the battery, select a length that has a first likelihood of miss-detection. When having an almost empty battery, the user equipment may select a length that has a lower likelihood, as miss-detection would cause a higher energy consumption than transmitting, for example, a longer preamble.

Alternatively or in addition the base station may be configured to instruct a specific user equipment to use a sequence having the first length or using a sequence having the second length. The base station may be configured to allow a number of lengths such that the user equipment may select a specific length on its own or may instruct the user equipment that the user equipment is instructed to use a sequence having a specific length. To allow a pool of sequences to be used, the base station may be configured to transmit a radio signal to one or more user equipment. This radio signal may comprise information indicating an assignment of sequences having the first length to one or more user equipment, i.e., a group of at least one user equipment. Alternatively or in addition, the base station may transmit the radio signal so as to comprise information indicating an assignment of sequences having a different length to at least a second user equipment, i.e., to a different group of user equipment.

In other words, the random access preamble sequence length and the assignment of users to different sets of given lengths can be adapted by the base stations based on different criteria. Examples for these criteria can be:
- the channel quality of users and the distance to the serving base station (e.g., determined by RSRP—reference signal received power—measurements),
- the current cell load,
- the type of device and/or the priority or requirement to quality of service of a device For example, shorter sequences may be assigned to users that are close to the base station, in order to avoid overhead due to long cyclic prefixes. In order to implement the adaptive RACH preamble scheme (i.e., in order to enable the users to know which preamble sets they are assigned), base stations may signal the following information to the users:
- messages that enable the users to derive to which group they belong,
- the corresponding RACH preamble length or an index for a set of pre-defined sequence lengths, and
- which subset of RACH resources is assigned to which group.

This information may be broadcast periodically or at least in time intervals such that user equipment that aim to communicate with the base station is able to derive the information in connection with the sequence length. For example, in LTE based systems, this can be implemented using the system information blocks (SIB).

Embodiments described herein thus are concerned with the length of preamble sequences used in random access channels of cellular communications systems, for example, in LTE systems. When compared to known systems that use sequences of fixed length, different lengths and/or a varying length may comprise a number of advantages. The length of a sequence may comprise a crucial influence on the performance of the system. For example, long sequences may lead to high detection accuracy, i.e., low detection errors, and increase the number of available sequences, but they also involve more time and energy for transmission. Supporting adaptive preamble sequence lengths may allow adjustment of this trade-off dynamically, according to instantaneous or at least varying demands.

A limitation of the known procedure is that the preamble format is configured for a complete cell. Thus, the random access procedure cannot for different requirements or different device types. This is overcome by embodiments described herein. Described is a mechanism that enables different lengths of preamble sequences in an RACH of a cellular communication system. Thereby, in contrast to existing mechanisms discussed within 3GPP, longer preambles do not have to be composed of simple repetitions of shorter preambles. The set of available preamble lengths can be configured by the base stations and a particular length can be assigned to all users, to a group of users or to individual users in the corresponding cells. The set of available sequence lengths and the assignment of users or groups of users to sets of sequences of particular lengths can be adapted by the base stations or the user equipment based on user-specific quality of service (QoS) requirements, cell-specific performance criteria, other criteria or a combination thereof.

In case different users within the same cell apply sequences of different lengths, good correlation properties (for example, in case of frequently used ZC sequences) are possibly not guaranteed any more. A solution may be provided by using different sequence sets, wherein all sequences of a given set may comprise a same length as has been described in connection with the sequence pools 114a and 114b. In this way, only sequences of the same length are likely to appear together. Consequently, the overall resources that are available for the RACH may be divided among the different sets and thereby assigned to the particular-length sequences as described for the PRACH 116a to 116c in FIG. 5. Several schemes for dividing the resources may be implemented. In the simplest scheme, the available resources may be equally divided among the sets and assigned, for example, in a round-robin fashion. According to this scheme, users know which resource set belongs to which preamble length, such that they know when to transmit.

Different sequence lengths may be used to enable different device classes. This may go beyond the already existing separation of the sequence pool, i.e., the set of available sequences, between contention-free and contention-based random access. Such a further division into several pools with different probability of collision and detection can, for example, separate latency-critical devices from delay-tolerant devices. For example, a separate pool of sequences with properties suitable for low latency requirements can be assigned to latency-critical devices. In a similar way, sequence pools that support a larger number of users can be assigned to IoT devices which, however, may involve less PRACH resources, since the size and frequency of data transmission of these devices may be typically low.

Figure 6:
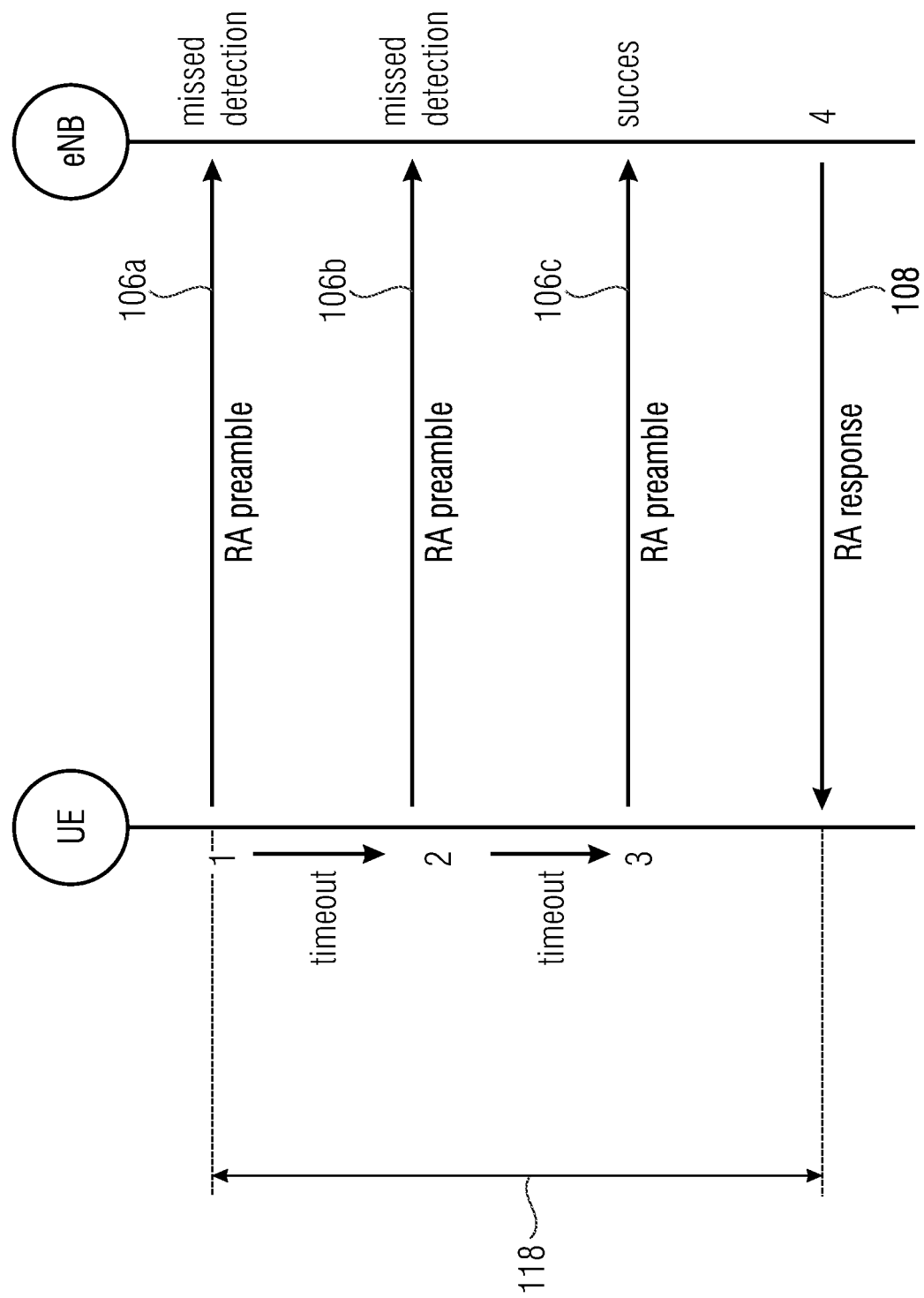
FIG. 6 shows a schematic flow chart of transmitted messages according to a scenario in which the user equipment is not recognized by the base station for a number of times, according to an embodiment.

According to a further aspect, a user equipment may be configured to determine a duration of a random access process. When referring again to FIG. 3, the UE transmits the radio signal 106 and receives the RA response 108. A time between transmission of the radio signal 106 and the reception of the radio signal 108 may at least influence or it may be the duration of the random access process. When referring now to FIG. 6, there is illustrated a scenario in which the user equipment is not recognized by the base station for a number of times. For example, the user equipment transmits a radio signal 106a which may be the radio signal 106 of FIG. 3. After missing the response from the base station a timeout occurs which may lead the user equipment to re-transmit the radio signal 106a as a retransmission 106b. By non-limiting example only, the eNB is again unable to receive or unable to confirm reception of the signal 106b such that, after a further timeout, the UE retransmits its signal as radio signal 106c. This signal is successfully received and decoded at the eNB whereupon the radio signal 108 is transmitted and received by the UE. Alternatively or in addition, it is possible that the radio signal 106a or the radio signal 106b is received by the eNB but, the then-transmitted response 108 gets lost which also causes a timeout. In any case, the loss of a message or a propagation delay may influence a duration 118 of the random access process.

Figure 7:
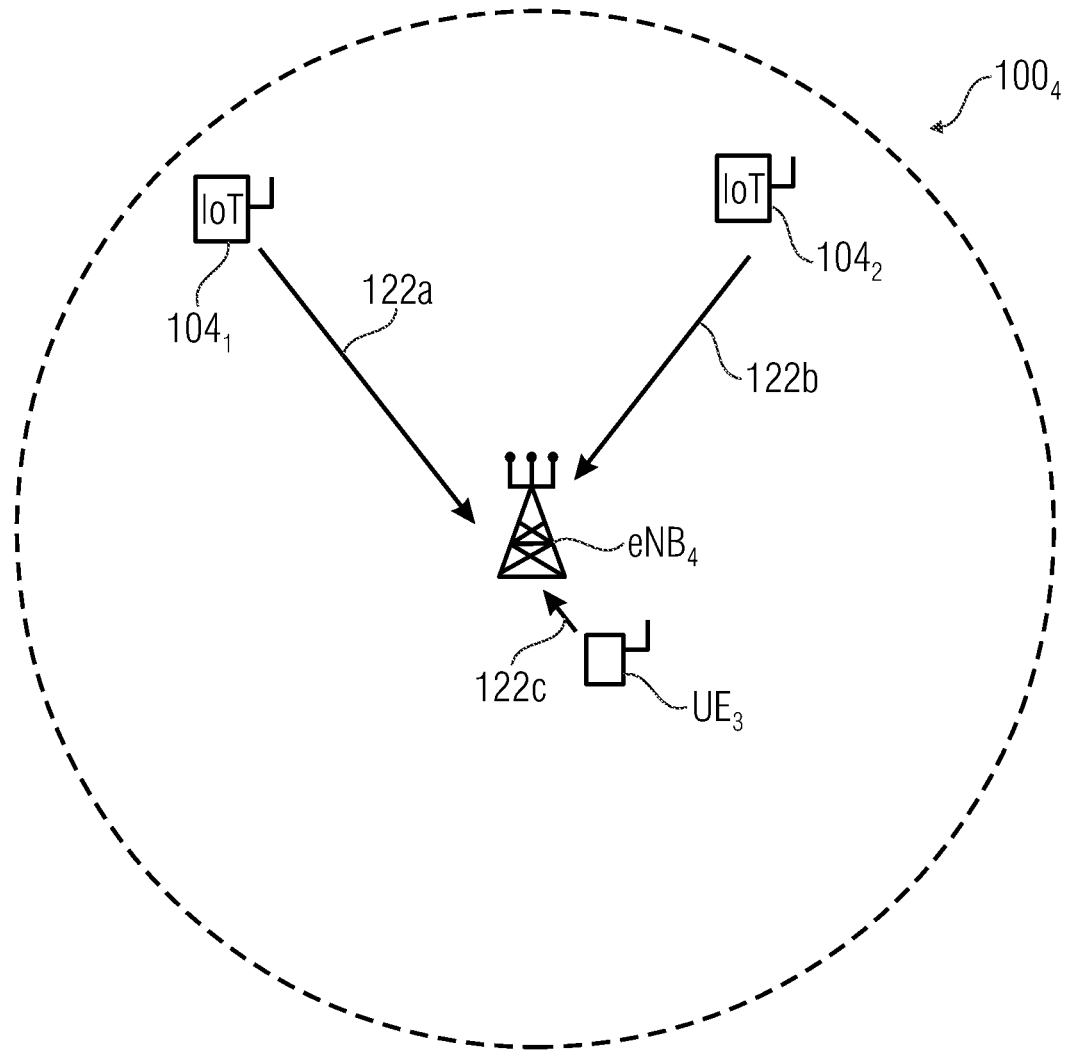
FIG. 7 shows a schematic view of a wireless communications network cell of FIG. 1, wherein IoT devices communicate directly with the base station, according to an embodiment.

FIG. 7 shows a schematic view of the wireless communications network cell $100_4$ of FIG. 1. For example, the IoT devices $104_1$ and $104_2$ may communicate directly with the base station $eNB_4$. The user equipment $UE_3$ may also communicate directly with the base station $eNB_4$. The user equipment $UE_3$ and/or one of the IoT devices $104_1$ and $104_2$ may be configured to transmit a radio signal 122a, 122b, 122c, respectively, comprising a respective duration information 118, wherein the duration information may indicate a duration of the random access process carried out by the user equipment, by the IoT device respectively.

Although embodiments are described herein as relating to user equipment, the embodiments also relate to any other apparatus communicating in a wireless communications network cell, for example, an IoT device.

The base station $eNB_4$ may be configured to adapt the control of the wireless communications network cell $100_4$ based on the duration information 118. The control of the operation of the wireless communications network cell may comprise a plurality of possibilities. For example, the $eNB_4$ may recognize that devices in at least a region of the wireless communications network cell comprise a large duration for performing the random access process. Thus, the base station may be configured to adapt filters or the like to increase reception sensitivity in connection with such a region. Alternately or in addition, the base station $eNB_4$ may determine that a special device class needs a longer duration and may prioritize such a device class. Alternatively or in addition, the base station may monitor or observe reported duration information over time and may, for example, determine that duration increases or decreases over time. Based thereon, the base station may determine to adapt communication with at least one node in the wireless communications network cell $100_4$ based on a low amount of nodes leading to a low amount of collisions and therefore to a low duration of the random access process or vice versa. The base station may adapt any other control of the wireless communications network cell based on the duration information.

The aspects of using sequences of different lengths and to transmit the duration information from a device to a base station may be executed individually but may also be performed in combination. Thus, $eNB_4$ may be configured to establish a connection to the user equipment $UE_3$ in response to reception of a sequence having a predetermined length. The base station $eNB_4$ may be configured to determine and/or to adapt the predetermined length. I.E., the base station may determine or adapt at least one sequence length to be used by the user equipment $UE_3$ as has been described in connection with the wireless communications network cell $100_2$. For establishing a connection with user equipment $UE_3$ and/or to at least one IoT device $104_1$ or $104_2$ the base station may use sequences comprising a different length that are repetition-free with respective to each other as has been described in connection with the wireless communications network cell $100_2$ dynamically. Alternatively or in addition, $UE_1$ and/or $UE_2$ may be configured to transmit a radio signal comprising the duration information 118 to the base station $eNB_2$. The base station $eNB_2$ may be configured to adapt control of the wireless communications network cell $100_2$ based on the duration information as has been described in connection with the wireless communications networks cell $100_4$.

In other words, in current cellular networks, such as LTE, the total duration of a random access procedure (including all collisions/timeouts) is only known to the user. However, this information can be vital to the base stations in order to adapt the system configuration. In particular, based on the knowledge of the duration of previous random access attempts, the base stations can adapt the random access procedure in order to improve the performance of critical users. This can be done, for example, based on the scheme described in connection with embodiments described herein for adaptive RACH sequence lengths. Long random access procedures in the past imply a large number of collisions or timeouts. Therefore, for users with too long random access procedures, given the users' service requirements, the base station can adapt the size of the preamble in order to increase the robustness. Alternatively or in addition, the base station may re-organize the assignment of users to RACH resource groups, in order to speed up random access procedures.

Embodiments described herein provide the advantage that the communication overhead due to the random access procedure may be scaled and/or adapted to the requirements of different classes of services or devices. Shorter sequences may lead to a reduced overhead due to RACH since the transmission of shorter sequences may lead to shorter overall RACH procedures. Moreover, the transmission energy involved may be reduced, which leads to a decreased energy consumption for UEs. Furthermore, different classes of devices, i.e. latency-critical devices can be separated from other devices and assigned to different sequence pools when compared to users with delay-tolerant devices. In addition, if the system design permits, shorter sequences also allow the multiplexing of a given number of users in the same PRACH resources with a reduced collision probability (in case of non-slotted RACH). Or, vice versa, more users can be supported in a given PRACH slot.

A possible field of application for the proposed scheme is in future cellular networks such as 5G networks as well as the evolution of LTE-A based networks. Here, a large number of energy limited devices, with QoS requirements that differ fundamentally from the requirements of conventional cellular users, may have to be served by the network. The proposed embodiments allow adapting the random access procedure of different devices to reflect the different requirements. In order to increase the robustness, base stations can adapt the size of the preambles for users whose random access procedures take too much time, given the users' service requirements. Alternatively, the base station may re-organize the assignment of users to RACH resource groups, in order to speed up random access procedures. Embodiments described herein may be applied to cellular networks that use contention-based RACH in the uplink of the cellular network.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] Sesia, Stefania, Matthew Baker, and Issam Toufik. "LTE—The UMTS Long Term Evolution: From Theory to Practice," 2nd edition, John Wiley & Sons, 2011.
[2] 3GPP TS 36.211 v13.1.0 (2016 March), p. 55 ff.
[3] 3GPP TS 36.211 v13.1.0 (2016 March)
[4] 3GPP TSG-RAN1 Meeting #85, Motorola Mobility, Change Request on TS 36.213 v13.1.1, R1-165972
[5] 3GPP TSG-RAN WG4 Meeting #79, Huawei, HiSilicon, Change Request on TS 36.133 v13.3.0, R4-164481
[6] 3GPP TSG-RAN2 Meeting #94, Ericsson (Rapporteur), Change Request on TS 36.321 v13.1.0, R2-164521
[7] http://lteuniversity.com/

The invention claimed is:

1. A base station configured to control a wireless communications network cell of a wireless communications network;
   wherein the base station is configured to use an antenna to establish a connection to a first user equipment and to a second user equipment using a random access process;
   wherein the base station is configured to establish the connection to the first user equipment responsive to a sequence of a first random access preamble received during a first random access process, the sequence comprising a first length; wherein the base station is configured to receive duration information indicating the duration of a random access process carried out by the first user equipment; and
   wherein the base station is configured to establish the connection to the second user equipment responsive to a sequence of a second random access preamble received during a second random access process, the sequence comprising a second length; wherein the base station is configured to receive duration information indicating the duration of a random access process carried out by the second user equipment; and
   wherein the base station is configured to adapt the control of the wireless communications network cell based on the duration information.

2. The base station of claim 1, wherein the base station is configured to establish the first connection at a first time instance while not accepting the sequence comprising the second length and to establish the second connection at a second time instance while not accepting the sequence comprising the first length.

3. The base station of claim 1, wherein the sequence comprising the first length and the sequence comprising the second length are repetition-free with respect to each other.

4. The base station of claim 1, wherein the base station is configured to maintain the connection to the first user equipment and to the second user equipment at the same time.

5. The base station of claim 4, wherein the first user equipment and the second user equipment differ from each other with respect to a requirement on transmission quality or with respect to a requirement on transmission latency.

6. The base station of claim 1, wherein the base station is configured to transmit a radio signal to the first user equipment, the radio signal comprising information indicating that the first user equipment is instructed to use a sequence comprising the first length.

7. The base station of claim 1, wherein the base station is configured to transmit a radio signal to the first user equipment, the radio signal comprising information indicating that the first user equipment is instructed to use a sequence comprising the first length or is instructed to use a sequence comprising the second length.

8. The base station of claim 1, wherein the base station is configured to transmit a radio signal to at least one user equipment, the radio signal comprising information indicating an assignment of sequences having the first length assigned to the first user equipment, or an assignment of sequences having the second length assigned to the second user equipment.

9. The base station of claim 1, wherein the base station is configured to change one of the first length and the second length dynamically.

10. The base station of claim 1, wherein the base station is configured to receive duration information indicating a duration of a random access process carried out by a user equipment; and
    wherein the base station is configured to adapt the control of the wireless communications network cell based on the duration information.

11. The base station of claim 1, wherein the base station is configured to operate a plurality of sequences comprising the first length and a plurality of sequences comprising the second length, wherein sequences comprising the first length are orthogonal to each other or comprise a cross-correlation to each other being below a threshold value and wherein sequences comprising the second length are orthogonal to each other or comprise a cross-correlation to each other being below the threshold value.

12. The base station of claim 1, wherein the base station is configured to establish a connection to the first or second user equipment in response to reception of a sequence comprising a predetermined length; and
    wherein the base station is configured to adapt the predetermined length based on the duration information.

13. The base station of claim 12, wherein the base station is configured to establish a connection to a first user equipment and to a second user equipment using a random access process;
    wherein, to establish the connection to the first user equipment, the base station is configured to use a sequence of a first random access preamble, the sequence comprising a first length;
    wherein, to establish the connection to the second user equipment, the base station is configured to use a sequence of a second random access preamble, the sequence comprising a second length, wherein the sequence comprising the first length and a sequence comprising the second length are repetition-free with respect to each other.

14. The base station of claim 1, wherein a random access process is a contention-based random access process.

15. A non-transitory storage medium having stored thereon a radio signal comprising duration information indicating a duration of a random access process carried out by a user equipment in a wireless communications network cell being operated by a base station according to claim 1.

16. A user equipment configured to operate in a wireless communications network cell;
wherein, to establish connection to a base station, the user equipment is configured to use an antenna to transmit a first random access preamble comprising a first sequence comprising a first length during a first random access process and to transmit a second random access preamble comprising a second sequence comprising a second length during a second random access process, wherein the first sequence and the second sequence are repetition-free with respect to each other; and
wherein the user equipment is configured to transmit a duration information indicating a duration of a random access process carried out by a user equipment to the base station.

17. The user equipment of claim 16, wherein the user equipment is configured to receive a radio signal from the base station, the radio signal comprising information indicating that the user equipment is instructed to use a sequence comprising the first length or to use a sequence comprising the second length; and
wherein the user equipment is configured to select a sequence comprising the first length or a sequence comprising the second length based on an operational parameter of the user equipment.

18. The user equipment of claim 16, wherein the user equipment is configured to receive a radio signal from the base station, the radio signal comprising information indicating that the user equipment is instructed to use a sequence comprising the first length or is instructed to use a sequence comprising the second length, wherein the user equipment is configured to use the sequence according to the instructions.

19. The user equipment of claim 16, wherein the user equipment is configured to use the sequence comprising the first length out of a plurality of sequences comprising the first length and to use the sequence comprising the second length out of a plurality of sequences comprising the second length, wherein the sequences of the first plurality are orthogonal to each other or comprise a cross-correlation to each other being below a threshold value and wherein sequences of the second plurality are orthogonal to each other or comprise a cross-correlation to each other being below the threshold value.

20. A wireless communications network comprising:
a base station according to claim 1; and
a user equipment according to claim 16.

21. A non-transitory storage medium having stored thereon a radio signal comprising information indicating that a user equipment is instructed to use a sequence of one of a first sequence pool and a second sequence pool according to claim 16.

22. A method for operating a base station to control a wireless communications network cell of a wireless communications network, the method comprising:
establishing a connection to a first user equipment and to a second user equipment using a random access process;
wherein, the connection to the first user equipment is established responsive to a sequence of a first random access preamble, the sequence comprising a first length; and
receiving duration information indicating the duration of a random access process carried out by the first user equipment;
wherein the connection to the second user equipment is established responsive to a sequence of a second random access preamble, the sequence comprising a second length;
receiving duration information indicating the duration of a random access process carried out by the second user equipment; and
adapting the control of the wireless communications network cell based on the duration information.

23. A non-transitory digital storage medium having a computer program stored thereon to perform the method of claim 22 when said computer program is run by a computer.

24. A method for operating a user equipment to operate in a wireless communications network cell, the method comprising:
transmitting, to establish connection to a base station, a first random access preamble comprising a first sequence comprising a first length during a first random access process and transmitting a second random access preamble comprising a second sequence comprising a second length during a second random access process, wherein the first sequence and the second sequence are repetition-free with respect to each other; and
establishing a connection to a base station in the wireless communications network cell by performing a random access process; and
transmitting a duration information indicating a duration of a random access process carried out by a user equipment to the base station.

25. A non-transitory digital storage medium having a computer program stored thereon to perform the method of claim 24 or the method for operating a user equipment to operate in a wireless communications network cell, the method comprising:
establishing a connection to a base station in the wireless communications network cell by performing a random access process; and
transmitting a duration information indicating a duration of a random access process carried out by a user equipment to the base station,
when said computer program is run by a computer.

* * * * *